United States Patent
Scholl

(10) Patent No.: US 8,284,989 B2
(45) Date of Patent: Oct. 9, 2012

(54) METHOD FOR LOCATING AN OBJECT ASSOCIATED WITH A DEVICE TO BE CONTROLLED AND A METHOD FOR CONTROLLING THE DEVICE

(75) Inventor: Holger R. Scholl, Herzogenrath (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1193 days.

(21) Appl. No.: 11/574,049

(22) PCT Filed: Aug. 17, 2005

(86) PCT No.: PCT/IB2005/052708
§ 371 (c)(1),
(2), (4) Date: Feb. 21, 2007

(87) PCT Pub. No.: WO2006/021916
PCT Pub. Date: Mar. 2, 2006

(65) Prior Publication Data
US 2009/0116691 A1 May 7, 2009

(30) Foreign Application Priority Data
Aug. 24, 2004 (EP) .................................. 04104058

(51) Int. Cl.
*G06K 9/00* (2006.01)
(52) U.S. Cl. ............. 382/103; 345/6; 356/620; 398/106; 398/115; 398/130
(58) Field of Classification Search ................. 382/103; 345/6; 356/620; 398/115, 106, 130
See application file for complete search history.

(56) References Cited

U.S. PATENT DOCUMENTS

| | | | |
|---|---|---|---|
| 5,963,145 A | 10/1999 | Escobosa | |
| 6,911,968 B2 * | 6/2005 | Shah-Nazaroff | 345/158 |
| 7,168,050 B1 | 1/2007 | Kwon et al. | |
| 7,292,151 B2 * | 11/2007 | Ferguson et al. | 340/573.1 |
| 7,360,708 B2 * | 4/2008 | Miyake et al. | 235/472.01 |
| 7,362,477 B2 * | 4/2008 | Ishikawa et al. | 358/473 |
| 7,386,323 B2 * | 6/2008 | Chen et al. | 455/556.1 |
| 2002/0129366 A1 | 9/2002 | Schein et al. | |
| 2003/0007104 A1 | 1/2003 | Hoshino et al. | |

(Continued)

FOREIGN PATENT DOCUMENTS

CN 1299214 A 6/2001

(Continued)

*Primary Examiner* — Wesley Tucker

(57) ABSTRACT

The invention describes a method for locating an object ($B_1$, $B_1'$, $B_2$, $B_3$) associated with a device ($D_1$, $D_2$, $D_3$) to be controlled, which method comprises aiming a pointing device (1) comprising a camera (2) at a target area (A), generating an image (3) of the target area (A) aimed at by the pointing device (1) and analysing the target area image (3) to determine a property of the object ($B_1$, $B_1'$, $B_2$, $B_3$). A feedback signal (4), regarding the property of the object ($B_1$, $B_1'$, $B_2$, $B_3$), is generated based on analysis of the images (3) and reported to the user by rendering the feedback signal (4) into a tactile indication generated in at least part of the pointing device (1). The invention also describes a pointing device (1), a device control interface (8, 8') and a system comprising such a pointing device (1) and device control interface (8, 8') suitable for applying this method. Furthermore, the invention describes a method and a system (15) for controlling a device ($D_1$, $D_2$, $D_3$) using such a method for locating an object (B1, $B_1'$, $B_2$, $B_3$) associated with the device ($D_1$, $D_2$, $D_3$).

20 Claims, 4 Drawing Sheets

U.S. PATENT DOCUMENTS

| | | |
|---|---|---|
| 2003/0069077 A1 | 4/2003 | Korienek |
| 2004/0004723 A1* | 1/2004 | Seko et al. .................... 356/498 |
| 2004/0208588 A1* | 10/2004 | Colmenarez et al. ......... 398/115 |
| 2006/0050052 A1* | 3/2006 | Mekenkamp et al. ........ 345/156 |

FOREIGN PATENT DOCUMENTS

| | | |
|---|---|---|
| DE | 10110979 A1 | 9/2002 |
| JP | 9026850 A | 1/1997 |
| JP | 11262073 A | 9/1999 |
| JP | 200306727 A | 3/2003 |
| KR | 2000060380 A | 10/2000 |
| WO | 0138960 A1 | 5/2001 |
| WO | 03056531 A | 7/2003 |

* cited by examiner

METHOD FOR LOCATING AN OBJECT ASSOCIATED WITH A DEVICE TO BE CONTROLLED AND A METHOD FOR CONTROLLING THE DEVICE

This invention relates to a method and system for locating an object associated with a device to be controlled and to a pointing device and device control interface for such a system. Furthermore, the invention relates to a method and system for controlling such a device.

The use of pointers, such as laser pointers or "wands" has become widespread in recent years. Such pointers are essentially passive devices, since they can only be used to point at objects, typically for pointing out items on a screen or projection to members of an audience. However, their use is limited to such situations, and they cannot be used, for example, to directly control or interact with a device.

For convenient and comfortable, if limited, control of devices such as consumer electronics devices, the remote control has become established in recent decades. A remote control, usually held in the hand and pointed at the device to be controlled, e.g. television, DVD player, tuner, etc., is used to select among a number of options, typically by pressing a button, and is typically restricted for use with one, or at most a few such devices. The options available for a device are generally predefined and limited to a certain number, and are displayed on a screen so that the user can study the available options before pressing the appropriate button on the remote control. Generally, a user must spend a considerable amount of time studying the available options and the associated buttons or combinations of buttons on the corresponding remote controls if he is to make the best use of the devices. Quite often, the functions of the buttons are not apparent and may confuse the user. Even the manuals or user guides supplied with the devices are often unable to clearly explain how a particular function is to be programmed. As a result, a user is often unable to get the most out of the devices he has bought, and a user of unfamiliar devices in a new environment might completely fail to understand how he is to interact with them.

Another drawback of a remote control, particularly when being used to interact with a device that does not feature a display, is that the user receives no feedback as to whether the command just issued has actually been received by the device at which it was directed. A considerable amount of guesswork is involved in interacting with such a device. Furthermore, a typical remote control can give the user no confirmation that he is pointing it in the right direction. The user only becomes aware that he is aiming the remote control incorrectly when the command he has attempted to issue fails to take effect. The correct aiming of the remote control also effectively involves guesswork.

Therefore, an object of the present invention is to provide a more accurate and intuitive method of interacting with a controllable device.

To this end, the present invention provides a method for locating an object associated with a device to be controlled, which method comprises aiming a pointing device comprising a camera at a target area, generating an image of the target area aimed at by the pointing device, and analysing the target area image to determine a property of the object. On the basis of the image analysis, a feedback signal regarding the property of the object is generated and conveyed to the user by rendering the feedback signal into a tactile indication generated in at least part of the pointing device.

The object to be located, associated with the device to be controlled, can be the housing of the device itself, as in the case of a consumer electronics device, household appliance, or any type of electrical or electronically controlled device such as a light switch, a loudspeaker etc. Equally, the object can be any other item, real or virtual, representing the device to be controlled. For example, the user might aim the pointing device at a lamp or image of a lamp, whereas the associated device to be controlled is in fact the light switch that turns this lamp on or off. The relationship between an object and an actual device which it represents might be predefined in a prior step of training the device control interface, which is preferably capable of controlling a number of devices or applications. The object may also be an option for selection such as a menu option shown on a display or printed, in, for example a programme.

The "property" of an object as determined in the analysis of target area images is to be understood in its broadest possible sense, since such a property can be, to name just a few examples, the visibility or lack of visibility of the object in the target area image, the distance between the object and a reference point, the controllability of a device associated with this object—essentially any appropriate descriptor can be a "property" of the object. The properties identified by the image analysis will change with the progression of time. For example, the distance between a reference point and an object in the vicinity might be a first type of property to be identified or calculated. Then, as the user moves the pointing device so that it is aimed at the object, a property identifying the object itself might be deduced. With the object successfully identified the next type of property might be a set of commands available to the user for interaction with the device associated with this object. As will be described in more detail later, the feedback signal can be generated to reflect the nature of the current property of the object.

The method according to the invention opens whole new applications for a pointing device. Particularly, with the aid of such a pointing device, a user can locate objects associated with a device, simply by aiming the pointing device in any direction. Feedback signals, rendered into palpable signals which can be felt by the user, may convey to him the direction in which the pointing device must be aimed to locate the object. This capability of the pointing device, together with its convenient pointing modality, combines to make the present invention a powerful and practical tool for myriad situations in everyday life.

According to the invention, a system for locating an object associated with a device to be controlled comprises a pointing device with a camera for generating images of a target area in the direction in which the pointing device is aimed, an image analysis unit for analysing the images to determine a property of the object, a feedback signal generation unit for generating a feedback signal regarding the property of the object, based on analysis of the images, and a tactile indication unit of the pointing device for rendering the feedback signal into a tactile indication.

Therefore, a pointing device according to the invention should comprise the camera for generating images of the target area in the direction in which the pointing device is aimed, and the tactile indication unit for rendering a feedback signal, generated on the basis of an image analysis of the target area image, into a tactile indication generated in at least part of the pointing device.

In a preferred embodiment of the invention, the method can be used not only to locate an object associated with a device to be controlled, but can also be used to control that device. A method for controlling a device according to an embodiment of the present invention thus involves directing the pointing device containing the camera at a target area encompassing at least part of an object associated with the device, generating an image of the target area, analysing the target area image, generating a control signal for controlling the device based on analysis of the image, and transmitting the control signal to the device to be controlled. Thereby, the control signal may be generated according to any relevant actions taken on the part of the user.

Such relevant actions might involve making a certain gesture with the pointing device or manipulating a control input on the pointing device while aiming the pointing device at an object associated with the device. Such a control input can be a button, knob, dial etc., which the user can press, push or otherwise activate. Equally, the control input might comprise a touch-sensitive area on the pointing device which is capable of registering a touch administered by the user. The design of the pointing device might even permit of a keypad or number of keys as a command input modality.

A "device control interface" may be used to provide feedback signals based on information regarding the controllability of devices and the locations of objects associated with these devices. Furthermore, such a device control interface can also be used in controlling the devices.

For applying the method for locating an object associated with a device to be controlled, such a device control interface comprises at least an image analysis unit for analysing the images, and a feedback signal generation unit for generating a feedback signal corresponding to a property of the object associated with the device to be controlled, based on analysis of the images. For use in controlling the device, such a device control interface also comprises a control signal generator for generating an appropriate control signal, and a communication interface for communicating the control signal to the device to be controlled. As will be explained later, such a device control interface can be incorporated in the pointing device or can be realised as an external unit, coupled with the pointing device by means of a suitable communication interface.

In a particularly preferred embodiment of the invention, the image analysis unit is configured or realised so that it can, on the basis of the image processing results, determine the relative direction in which the user is aiming the pointing device as well as identifying the actual object pointed at by the user. The results of the image analysis can therefore be used, as appropriate, for feedback signal generation as well as for control signal generation. Alternatively separate image analysis units can be used to provide results for feedback signal generation and control signal generation.

The further claims and the subsequent description disclose particularly advantageous embodiments and features of the invention.

The camera for generating images is preferably incorporated in the pointing device, but might equally be mounted on the pointing device, and is preferably oriented in such a way that it generates images of the area in front of the pointing device targeted by the user. The camera might be constructed in a basic manner, or it might feature powerful functions such as zoom capability or certain types of filter.

Therefore, the "target area" is the area in front of the pointing device which can be captured as an image by the camera. The image of the target area—or target area image— might cover only a small subset of at the surroundings, or it might encompass part of an object or an entire object, or it might include part of the surroundings as well as the object. For example, when the user is trying to locate an object, the target area images might initially only show the surroundings. Then, when the feedback signals have assisted the user in locating the desired object, and the user is subsequently aiming the pointing device at the object, the target area image will show at least part of the object and perhaps some of the surroundings also. The size of the target area image in relation to the any object encompassed by the target area might depend on the size of the object, the distance between the pointing device and the object, and on the capabilities of the camera itself. The user might be positioned so that the pointing device is at some distance from an object, for example when the user is standing at the other end of the room. Equally, the user might hold the pointing device quite close to the object in order to obtain a more detailed image.

To determine the relative position of the target area within the environment, the image analysis unit compares the target area image to a number of templates. These templates might show different areas of the environment, for example the templates might cover the four walls of a typical room in which the pointing device is used. The templates might also indicate the positions of any objects associated with any controllable devices in the environment. Using standard image processing techniques, the image analysis unit can locate the target area image in the templates, and then calculate its position relative to the objects.

As mentioned above, the feedback signal generated on the basis of the image analysis reflects the current property of the object of the device to be controlled. While the user is using the pointing device to locate an object in the vicinity, not yet encompassed in the current target area image, the feedback signal is applied to convey to the user a palpable or tactile indication of the direction in which he should move the pointing device. As the image analysis calculates the position of the object being approached by the pointing device, the feedback signal might reflect this movement by becoming increasingly or decreasingly intense, as appropriate, resulting in a palpable indication of correspondingly increasing or decreasing intensity. An increasingly intense or rapid feedback signal might indicate to the user that he is moving in on the target, i.e. the object. A diminishing feedback signal might, on the other hand, convey to the user the impression that he is moving in the wrong direction.

Furthermore, certain "patterns" of feedback signal might be associated with certain objects. For example, a feedback signal comprising a pre-defined pattern of long and/or short bursts might be associated with a particular object, so that when the target area of the pointing device traverse this object, the user is informed of this event by a corresponding palpable sequence of long and/or short vibrations.

Once the object is visible (from the point of view of image analysis) in the target area, the feedback signal might change to an affirmative type of signal, e.g. a sequence of short bursts, letting the user know by means of such an affirmative type of tactile indication that he is pointing in the right direction and at an object associated with a device with which the user can interact, using the pointing device.

The user might then proceed to interact with the device, by making use of a control input of the pointing device, or by moving the pointing device in a predefined manner. Should the user perform an action with the pointing device which cannot be successfully interpreted by the device control interface, this might also be conveyed to the user by means of an appropriate feedback signal and corresponding tactile indication, letting him know that he has, for example, moved the pointing device in an ambiguous manner, or attempted to carry out an action unsuitable to the device being controlled. Furthermore, if the object originally being pointed at should drift out of the target area as a result of inattention on the part of the user, so that the object is no longer visible in the target area, this might also be reported to the user by means of a short feedback signal. By applying controlled vibrations in this way, the pointing device can assist the user in accurately aiming at an object.

In a particularly preferred embodiment of the invention, the tactile indication might be rendered by converting the feedback signal into a short buzz or vibration, commonly referred to as "force feedback", in one or more parts of the pointing device. The feedback signal can even be rendered into a tactile indication by converting it into a low level of current which the user feels in his hand, preferably so low that it is not perceived as uncomfortable by the user.

To indicate a direction in which the user should move the pointing device, the pointing device is preferably equipped with a number of tactile indication units positioned about the circumference of the pointing device. Two distinct tactile indication units at essentially opposite "sides" of the pointing device might suffice to indicate "left" and "right". An appropriately greater number of tactile indication units positioned on various parts of the pointing device might be used to indicate a greater number of possible directions. The tactile indication units might lie flush with the surface of the pointing device, or might protrude from the surface. A tactile indication unit might simply vibrate without otherwise deviating from its fixed position or it might be made to move so that it presses against the user's hand and then returns to its original position.

To easily determine the object at which the user is aiming the pointing device, the image analysis unit of the device control interface preferably compares the image of the target area to a number of pre-defined templates, by applying the usual image processing techniques or computer vision algorithms. A single pre-defined template might suffice for the comparison, or it may be necessary to compare the image data to more than one template. Once the object has been identified in a template, the associated device, and level of controllability of the device, can be deduced or determined as a result. For example, if the user is aiming the pointing device at a speaker box of a loudspeaker, the image of the speaker box is compared to templates until a match is found, so that the associated device—"loudspeaker" or, more probably, the amplifier driving the loudspeaker—can be identified and the associated property—"volume"—can be deduced.

Pre-defined templates can be stored in an internal memory of the device control interface, or might equally be accessed from an external source. Preferably, the device control interface comprises an accessing unit with an appropriate interface for obtaining pre-defined templates for the objects from, for example, an internal or external memory, a memory stick, an intranet or the internet. In this way, a manufacturer of an appliance which can be controlled by a pointing device according to the invention can make templates for these appliances available to users of the devices. A template can be a graphic representation of any kind of object, such as an image of a television screen, a dimmer switch, a ventilator, etc. If the objects are options of a menu displayed, for example on a television screen, a template might show the positions of a number of menu options for the television, so that, by analysing image data of the target area when the user aims the pointing device at the television, the image analysis unit can determine which option is being aimed at by the user.

Preferably, a device control interface might be incorporated directly in the pointing device. In this case, the device control interface does not need a receiver, since it can obtain the images directly from the camera. The image analysis, feedback signal generation and control signal generation can take place in the pointing device, with the feedback signals, generated on the basis of the image analysis, being sent directly to the tactile indication units, and any control signals being transmitted in appropriate form from the pointing device directly to the device to be controlled.

On the other hand, since the capabilities of these units might be limited by the physical dimensions of the pointing device, which is preferably realised to be held comfortably in the hand, such an image analysis unit might suffice for rudimentary image analysis only, while more advanced image processing, necessitating a larger unit, might, along with the control signal generation and feedback signal generation, take place in an external device control interface.

In a particularly preferred embodiment of the invention, the pointing device incorporates a device control interface as well as a sending unit or transmitter for transmitting images to an external device control interface, and a receiving unit for receiving feedback signals from an external device control interface. Alternatively, the pointing device might altogether dispense with image analysis, feedback signal generation and control signal generation functions, allowing these tasks to be carried out by the external device control interface, thereby allowing the pointing device to be realised in a smaller, more compact form.

An external device control interface as described above might be a stand-alone device or might be incorporated into an already existing home entertainment device, a personal computer, or might be realised as a dedicated device control interface. To receive information from the pointing device, the external device control interface features a receiving unit for receiving images. A device control interface in an environment such as a hotel, office or home, might be realised so that the image processing, feedback signal generation and control signal generation take place centrally, whilst a number of receiving units, distributed about the building, can receive image data from any number of pointing devices. Equally, a number of application interfaces, also distributed about the building, can transmit control signals to the devices or appliances located in any room. Thus, the user can aim the pointing device at an object in one room to control a device located in a different room.

Furthermore, a device control interface need not be realised as a single entity. The units or modules comprising a device control interface can be distributed, as required, over a number of separate entities.

Clearly, the device control interface is not limited to use with a single pointing device. Any number of pointing devices might be used to send image data to the device control interface. For example, each member of a family might be supplied with such a pointing device for use in the home, or each visitor to a hotel might be supplied with a pointing device for controlling devices available to the visitor in that hotel. An advanced realisation might foresee the device sending an authorization code along with image data, so that, for example, only visitors checked in to the hotel can avail of the devices in that hotel. The authorization code might be hardwired in the pointing device, or might be entered by a user in some way, for example by means of the control input.

To maximise the usefulness of the pointing device and the device control interface, the user might train the device control interface to recognise objects and to associate them with particular devices to be controlled. To this end, the device control interface might feature a user interface such as keyboard or keypad so that the user can input information regarding the template images or device control parameters. For example, the manager of the hotel might take a picture of a radiator in one of the hotel rooms, using a camera or even the camera of the pointing device, and transfer the image to the internal memory of the device control interface. By means of suitable input commands to the device control interface, for example by entering commands via a keyboard or keypad, he can assign the image of the radiator object to the appropriate device, in this case the heating system. In this way, he can assign any object to any device, or may assign a number of different objects to a device. For instance, he might assign an image of a lamp, as well as an image of the switch controlling this lamp, to the light switch, which is in effect the device to be controlled. When a hotel guest aims a pointing device at either of these objects while manipulating a control input or moving the pointing device in a predefined manner, this can have the effect of controlling the light switch. Furthermore, the type of action might be specified by pointing at a certain part of the object, where different parts of the object are associated with different properties. For example, pointing at the thermostat of a radiator might indicate that the temperature of this radiator only is to be adjusted, whereas pointing at the body of the radiator would imply that the temperature of all the radiators in this room is to be adjusted.

The image of the target area might comprise image data concerning only significant points of the entire image, e.g. enhanced contours, corners, edges etc., or might be a detailed image with picture quality. For processing the image data in order to determine the region or object at which the user is aiming the pointing device, it is expedient to apply computer vision techniques to find a point in the target area at which the user has aimed, i.e. the target point.

A method of processing the target area images using computer vision algorithms might comprise detecting distinctive points in the target image, determining corresponding points in a template, and developing a transformation for mapping the points in the target image to the corresponding points in the template. The distinctive points of the target area image might be any suitably distinctive points. This transformation can then be used to determine the distance between a reference point, for example the centre of the target area image, relative to the object. In this way, comparing the target area image with a pre-defined template may be restricted to identifying- and comparing only salient points such as distinctive corner points. The term "comparing" as applicable in this invention is to be understood in a broad sense, i.e. by only comparing sufficient features in order to quickly identify the area or region at which the user is aiming, or to identify an object "visible" in the target area.

Another possible way of determining an object selected by the user is to directly compare the received target area image, centered around the target point, with a pre-defined template to locate the point targeted in the object using methods such as pattern-matching.

For intuitive use of the pointing device, a source of a concentrated beam of light might be incorporated in or on the pointing device such that a light point appears more or less in the centre of the target area captured by the camera. Such a source of a concentrated beam of light might be a laser light source, such as those used in many types of laser pointers currently available. In the following, it is therefore assumed that the source of a concentrated beam of light is a laser light source, without limiting the scope of the invention in any way. The location of the light point, fixed at a certain position in the target area and transmitted to the image analysis unit as part of the target area image, might be used as the target point to identify the actual object aimed at by the user.

The invention thus provides, in all, an easy and intuitive way of locating an object associated with a device to be controlled. For ease of use, the pointing device can be in the shape of a wand or pen in an elongated form that can be grasped comfortably by the user. The user can thus direct the pointing device at an object while positioned at a distance from it. Equally, the pointing device might be shaped in the form of a pistol. Furthermore, an additional light source might be mounted in or on the pointing device, serving to illuminate the area at which the pointing device is aimed, so that the user can still use the pointing device to locate an object, even if the surroundings are dark.

The pointing device and device control interface combine to give a powerful object location and device control system, for use in practically any kind of environment. For instance, it is conceivable that the system might find use in any public environment such as a hotel, airport, hospital etc., where a user can avail of the pointing device to locate and control unfamiliar devices or appliances in a convenient and intuitive manner, without having to know where the devices are located.

For example, a guest in a hotel might be issued with a pointing device upon checking in. He is informed that, in his hotel room, he can control functions and appliances using this pointing device. First, he only uses the pointing device to navigate through a graphical system that is displayed on a large multi-purpose screen in his room. The entertainment system, the messaging system and other devices or appliances are simply and intuitively controlled by aiming with the pointing device and indicating selections by pressing a control input on the pointing device. Whenever he points at a menu option, the item is not only highlighted on the screen, he also feels a slight vibration, or force feedback, in the pointing device. When he moves the pointing device away, the vibration ceases. When he moves the pointing device out of an application's control frame, a small but nevertheless palpable impulse indicates that he has "crossed a boundary". After a while, he realizes that he can also use the pointing device on "real" objects in the room. As he approaches the light switch, a tactile indication from the pointing device informs him that he is near a "hot object". When he aims the pointing device exactly at the switch, the vibration starts again, and he realizes that the light switch could be somehow used with the pointing device. He presses the button—and the lights go out. The slight but palpable force feedback from the pointing device in his hand helps him in the dark to accurately aim the pointing device at the light switch. He presses the button once more to make the lights go back on. In this way, the hotel guest can explore the whole room to find out all the possibilities of controlling the different devices in the room.

Other objects and features of the present invention will become apparent from the following detailed descriptions considered in conjunction with the accompanying drawing. It is to be understood, however, that the drawings are designed solely for the purposes of illustration and not as a definition of the limits of the invention.

Figure 1:
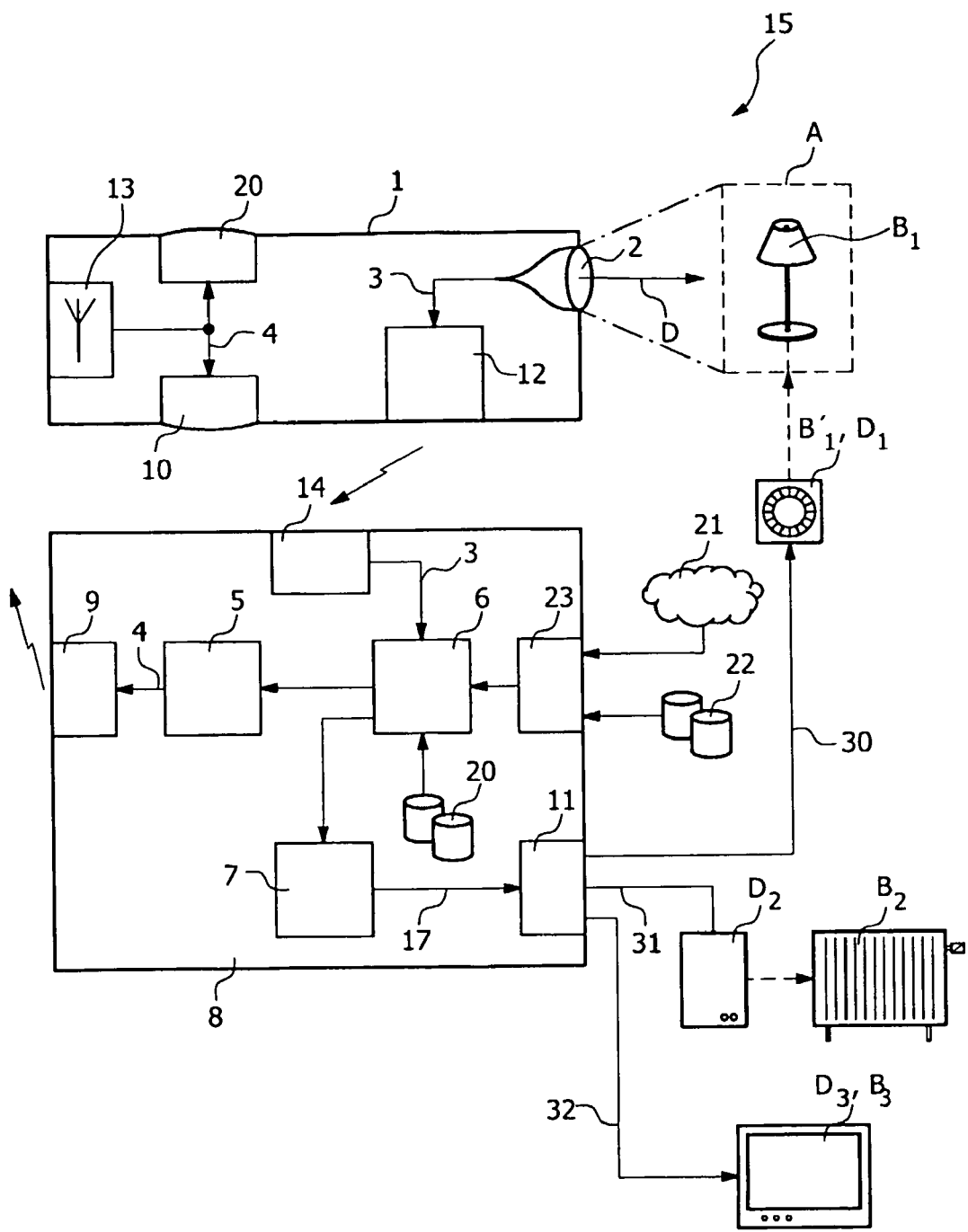
FIG. 1 is a schematic diagram of a system including a pointing device and a device control interface for controlling a number of devices in accordance with an embodiment of the present invention.

In the drawings, like numbers refer to like objects throughout. The pointing device 1 described is held and operated by a user, not shown in the drawings.

FIG. 1 shows a system 15 for controlling a number of devices $D_1$, $D_2$, $D_3$, comprising a pointing device 1 and an external device control interface 8.

The pointing device 1 contains a camera 2 which generates images 3 of the region in front of the pointing device 1 in the direction of pointing D. The pointing device 1 features an elongated form in this embodiment, so that the direction of pointing D lies along the longitudinal axis of the pointing device 1. The camera 2 is positioned towards the front of the pointing device 1 so that images 3 are generated of the region or target area A in front of the pointing device 1 at which a user, not shown in the diagram, is aiming.

The user can aim the pointing device 1 in basically any direction. Since a purpose of the pointing device 1 is to allow interaction with a device $D_1$, $D_2$, $D_3$, whereas the user may not know which devices $D_1$, $D_2$, $D_3$ can be controlled using the pointing device 1 or where objects $B_1$, $B_1'$, $B_2$, $B_3$ associated with the devices $D_1$, $D_2$, $D_3$ are located in his current environment, the pointing device 1 supplies the user with tactile feedback, helping him easily locate any objects $B_1$, $B_1'$, $B_2$, $B_3$ in the vicinity that are associated with controllable devices $D_1$, $D_2$, $D_3$.

The objects $B_1$, $B_1'$, $B_2$, $B_3$ shown in the figure are a lamp $B_1$, a dimmer light switch $B_1'$ for this lamp $B_1$, a radiator $B_2$ and a television $B_3$, such as might be found in any home or hotel room. Each of the objects $B_1$, $B_1'$, $B_2$, $B_3$ is associated with a one of a number of devices $D_1$, $D_2$, $D_3$. More than one object can represent a device to be controlled. In FIG. 1, the dimmer switch $D_1$, which is the actual device for controlling the brightness of the lamp, is represented by both its housing as object $B_1'$ and by the lamp $B_1$. It is equally intuitive for the user to point directly at the lamp $B_1$ since, after all, it is the brightness of the lamp $B_1$ that he wishes to alter.

To help the user locate an object $B_1$, $B_1'$, $B_2$, $B_3$, tactile indicator units 10, 20 can be made to "buzz" or vibrate, indicating that an object $B_1$, $B_1'$, $B_2$, $B_3$ is in the vicinity, or indicating in which direction the user must aim the pointing device 1 so that the object $B_1$, $B_1'$, $B_2$, $B_3$ appears in the target area A. For example, if the user holds the pointing device 1 in his hand such that the tactile indicator 10 is positioned on the left-hand side of the pointing device 1, and the tactile indicator 20 is located on the right-hand side of the pointing device 1, then a buzzing or vibrating in the left tactile indicator 10 would indicate that the user should move the pointing device 1 towards the left. If the user should aim the pointing device 1 more to the right, then the tactile indication unit 20 will buzz or vibrate to indicate this. The pointing device 1 can be provided with any number of tactile indication units, however, only two are shown in the diagram for the sake of clarity.

While the user is moving the pointing device 1, images 3 of the target area A in front of the pointing device 1 are generated with the camera 2 and transmitted to a device control interface 8. The images 3 are received in a receiving unit 14 and forwarded to an image analysis unit 6. Here, the images 3 are compared to templates or images of the surroundings in order to determine the position of the target area A relative to any objects $B_1$, $B_1'$, $B_2$, $B_3$ in the neighborhood. The results of the image analysis are forwarded to a feedback signal generation unit 5, where an appropriate feedback signal is generated. For example, if the image analysis unit 6 concludes that there is no object visible in the target area A, but an object is located to the left of the target area A, a feedback signal is generated to convey this information to the user.

The feedback signal 4 is sent by a sending unit 9 to the pointing device 1, where it is received by a receiver 13 and passed to the tactile indication units 10, 20 where it is rendered into a palpable signal such as a buzzing or vibration. The feedback signal 4 might be encoded so that only that part intended for a specific tactile indication unit 10, is also received or rendered by that unit 10, 20.

Different types of tactile feedback might be used to indicate different situations. For example, a series of vibrations in the appropriate tactile indication unit might indicate that the pointing device is moving in the wrong direction relative to an object. A different type of feedback signal 4 might be generated if an edge of the target area A has just traversed an object $B_1$, $B_1'$, $B_2$, $B_3$. On the other hand, if the target area A is tending to drift away from the object at which the pointing device 1 is aimed, this might be reported to the user by a specific type of feedback signal 4, for example a short buzz.

Once an object has been located, i.e. once the object is visible in the target area A, the user can use the pointing device 1 to control the device with which the object is associated. To this end, the pointing device 1 might feature a control input such as one or more buttons, not shown in this diagram. The function of the control input might depend on the device associated with the object, for example the control input might have a +/− function for a loudspeaker and increase or decrease the volume, or it might operate as an up/down controller for raising or lowering automatic window shades. To identify the object $B_1$, $B_1'$, $B_2$, $B_3$ aimed at by the pointing device 1, the images 3 are compared to templates of a number of objects. These templates might be retrieved as required from a database 20 or an external source 21, 22 via an accessing unit 23.

Ideally, the accessing unit 23 has a number of interfaces allowing access to external data, for example the user might provide pre-defined templates stored on a memory medium 22 such as floppy disk, CD or DVD, or the accessing unit 23 might retrieve suitable template information from an external network such as the internet 21, or from the manufacturer of the device. The templates may also be configured by the user, for example in a training session in which the user specifies the correlation between a device to be controlled $D_1$, $D_2$, $D_3$ and an object $B_1$, $B_1'$, $B_2$, $B_3$. The templates might show the objects $B_1$, $B_1'$, $B_2$, $B_3$ superimposed on a background, or might consist only of background images augmented by positional information regarding the locations of the objects $B_1$, $B_1'$, $B_2$, $B_3$ with respect to the background. In the case of a radiator, the template for the radiator might be an image showing the actual radiator as well as its surroundings, such as wallpaper, window, furniture etc. A more simple template for an object might just show the object itself without any surroundings. Such a template might be more suited to identifying an object $B_1$, $B_1'$, $B_2$, $B_3$ when it is encompassed by the target area A, whereas templates covering the background, augmented with positional information regarding the relative locations of the objects $B_1$, $B_1'$, $B_2$, $B_3$, would be more suitable for use in guiding the user in the direction of an object $B_1$, $B_1'$, $B_2$, $B_3$.

The image analysis unit 6 makes use of known image processing techniques to find the template most closely matching the image 3, thus identifying the object $B_1$, $B_1'$, $B_2$, $B_3$ being pointed at and the associated device $D_1$, $D_2$, $D_3$ to be controlled. This information is forwarded to a control signal generation unit 7, which then generates an appropriate control signal 17. This control signal 17 is in turn forwarded to an communication interface 11. The communication interface 11, which drives a number of applications or devices $D_1$, $D_2$, $D_3$, each possibly requiring different types of signal 30, 31, 32, can perform any necessary conversion to the control signal 17 in order to give a signal 30, 31, 32 suitable for the actual device $D_1$, $D_2$, $D_3$. In this case, the control signal 17 is converted into a form suitable for driving the dimmer $D_1$.

The devices $D_1$, $D_2$, $D_3$ shown in the diagram may be located close to each other or may be distributed over a number of different rooms. The application interface 11 of the device control interface 8 is capable of communicating with the devices by means of suitable interfaces, so that a device such as a heating system $D_2$ can be controlled from, for example, the living room, even though the heating system $D_2$ itself might be located in the cellar of the house. Such an interface might be wired, such as a bus or a local communication network, or might be a wireless connection such as a wireless LAN network, Bluetooth, etc.

The pointing device 1 might continually send images 3 to the device control interface 8, or might cease transmission automatically if it is not moved for a certain length of time. To this end, the pointing device 1 might comprise a motion sensor, not shown in the diagram. Since the pointing device 1 is most likely powered by batteries, also not shown in the diagram, it is expedient to only transmit data to the device control interface when the user actually moves the pointing device, in order to prolong the lifetime of the batteries. Transmission of image data 3 might be initiated as soon as the user takes up the pointing device, and might automatically cease once the user returns the pointing device to a resting position.

Figure 2:
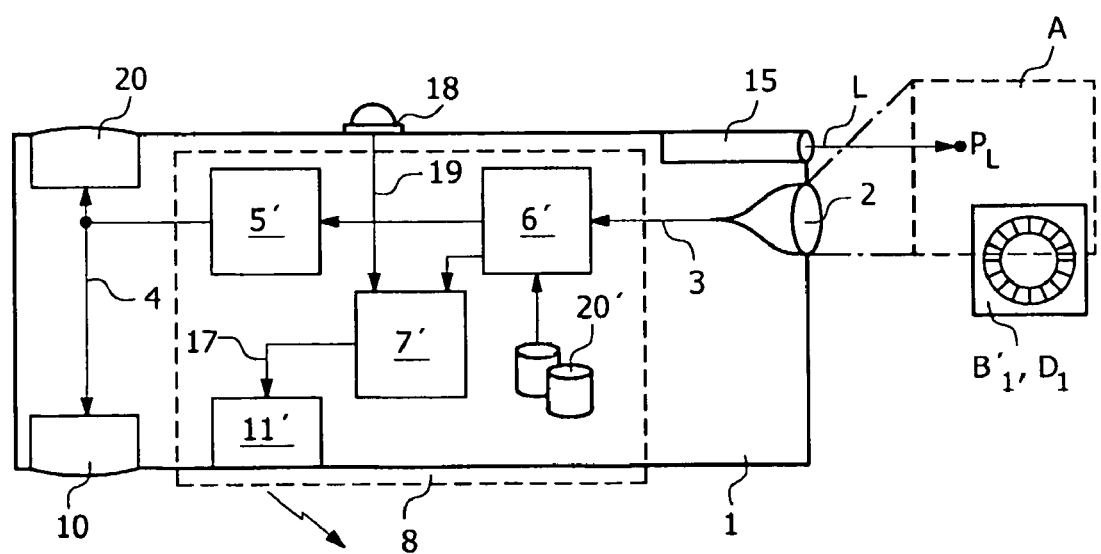
FIG. 2 is a schematic diagram of a pointing device and an object associated with a device to be controlled, where the object is encompassed by a target area aimed at by the pointing device.

FIG. 2 shows an alternative embodiment of the pointing device 1, featuring its own image analysis unit 6', feedback signal generator 5' and control signal generator unit 7' in its own local device control interface 8'. This pointing device 1 can locally analyse image data 3 generated by its camera 2 to generate a feedback signal 4 for its tactile indication units 10, 20 and control signals 17 for the appropriate device $D_1$, $D_2$, $D_3$. A local communication interface 11 transmits the control signal 17, after performing any necessary conversion.

In this figure, the pointing device 1 is being aimed at an object $B_1$, in this case a dimmer light switch $B_1$. In this embodiment of the pointing device 1, a source 16 of laser light is incorporated in the pointing device 1. Since a light point $P_L$ appears where the beam L of laser light strikes a surface, this can help the user see the region at which he is aiming the pointing device 1, or to follow the direction in which he is being exhorted to move the pointing device 1 by tactile feedback issuing from the tactile indication units 10, 20. The source 16 of laser light might be arranged so that the light point $P_L$ appears more or less in the middle of the target area A, and might be incorporated in the pointing device 1 itself.

Images of the target area A are processed continually, and appropriate feedback signals 4 are generated, until the user is successfully aiming the pointing device 1 at the object. It is not necessary for the entire object $B_1$ to appear within the target area A, as part of the object $B_1$ is sufficient for identification, as illustrated in the diagram. The images 3 are now analysed in the image analysis unit 6' to interpret any action taken by the user. For example, the user can manipulate a control input 18 in order to control the device $D_1$ in some way. Any signals 19 from such a control input 18 are processed in the control signal generator 7' along with the results of the image analysis, and appropriate control signals 17 for the device $D_1$ are subsequently generated.

The control signals 7 undergo any necessary conversion into a form understandable by the dimmer $D_1$ before being transmitted to the dimmer $D_1$ by the application interface 11'. For ease of use, the application interface 11' communicates in a wireless manner with the dimmer $D_1$.

As illustrated in FIG. 2, being able to perform the image processing and feedback/control signal generation locally means the pointing device 1 does not necessarily need to communicate with a separate device control interface 8 as described in FIG. 1. Since the quality of the image analysis might be limited by the physical dimensions of the pointing device 1, which will most likely be realised in a small and practical format, this "stand-alone" embodiment might suffice for situations in which the accuracy of the image analysis is not particularly important, or in situations where the pointing device 1 is unable to communicate with an external device control interface 8. The feedback signal 4 is generated locally in a feedback signal generator 5', and directly forwarded to the tactile indication units 10, 20.

This embodiment may of course be simply an extension of FIG. 1, so that the pointing device 1, in addition to the local device control interface 8', also avails of the sending unit 12 described in FIG. 1, allowing it to operate in conjunction with an external device control interface 8, in addition to its stand-alone functionality.

Figure 3:
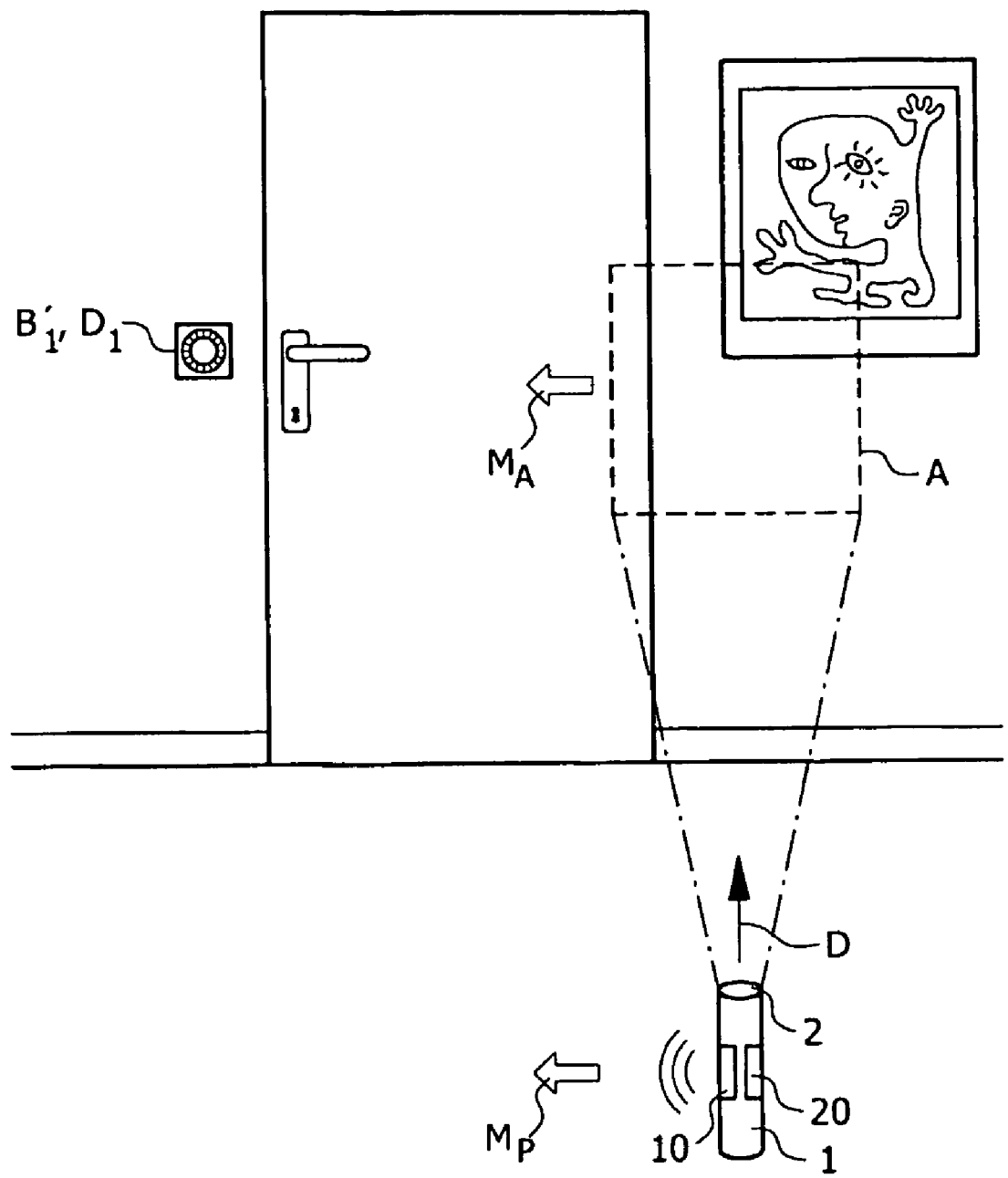
FIG. 3 is a schematic diagram of a pointing device and an object associated with a device to be controlled, where the object is not encompassed by a target area aimed at by the pointing device.

FIG. 3 shows the effect of the feedback more clearly. Here, a user is aiming the pointing device 1 within a room, and may wish to locate a controllable device $D_1$, in this case the light switch. This example has been chosen for the sake of simplicity, but it will be appreciated that the pointing device 1 can be used to locate objects or devices whose whereabouts are not so obviously visible.

The images of the target area A are sent to an external device control interface, not shown in the diagram, whose image analysis unit, using templates representing regions of this room, concludes that the user is currently aiming the pointing device at a region to the right of an object $B_1'$ associated with the device $D_1$.

A feedback signal generation unit of the external device control interface generates an appropriate feedback signal which is transmitted to the pointing device 1 and which causes the tactile indicator 10 to buzz or vibrate slightly, letting the user know that he should move the pointing device 1 more to the left in order to find the object $B_1'$. As the user moves the pointing device 1 in the direction $M_P$, the target area A effectively follows in the direction shown by the arrow $M_A$. Clearly, the user need not actually move in a lateral manner. He can just as well remain in the same position and merely adjust the angle of the hand in which he is holding the pointing device 1. The target area A, however, will still follow the desired direction $M_A$.

Images of the target area A are continually analysed in the image analysis unit until the object $B_1$ or a part of the object $B_1$ is detected in an image. At this point, the feedback signal might change, so that both tactile indication unit 10, 20 buzz briefly to let the user know that he is now aiming the pointing device 1 in the right direction. Now that the user has located the object $B_1$, he can proceed to control the device $D_1$ associated with this object $B_1$ as described in detail above in connection with FIG. 1 and FIG. 2.

Figure 4:
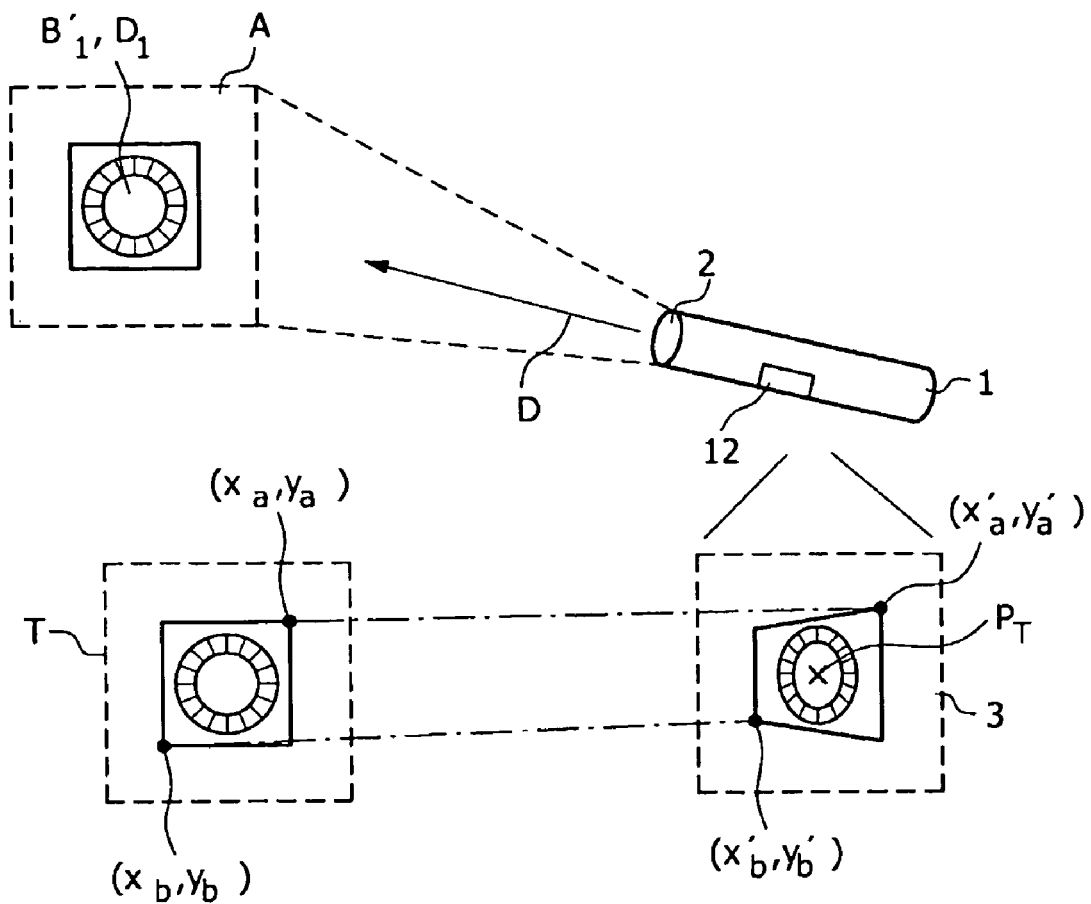
FIG. 4 is a schematic diagram showing an object, its associated template, and a target area image generated by a pointing device in accordance with an embodiment of the present invention.

The user will not always aim the pointing device 1 at an object from directly in front—it is more likely that the pointing device 1 will be aimed at a more or less oblique angle to the object, since it is often more convenient to pan or swivel the pointing device 1 than it is to change one's own position. This is illustrated in FIG. 4, which shows a schematic representation of a target area image 3 generated by a pointing device 1, aimed at the object $B_1'$ from a distance and at an oblique angle, so that the scale and perspective of the object $B_1'$ in the target area A, in this case a light switch $B_1$, appear distorted in the target area image 3.

Regardless of the angle of the pointing device 1 with respect to the object B₁', the target area image 3 is always centred around a target point $P_T$. The image processing unit of the device control interface compares the target area image 3 with pre-defined templates T to determine the object B₁' being pointed at the user.

The target point $P_T$, for the sake of simplicity, can be taken to be the point of intersection of the longitudinal axis of the pointing device 1 with the target area image A and located essentially in the centre of the target area image 3. The point in the template T corresponding to the target point $P_T$ can then easily be located.

Computer vision algorithms using edge- and corner detection methods are applied to locate points [$(x_a', y_a'), (x_b', y_b')$] in the target area image 3 which correspond to points [$(x_a, y_a), (x_b, y_b)$] in the template T of the object B₁'. In this example, only two point pairs are shown, but any number of point pairs can be identified as required in the target area image 3 and template T.

Each point can be expressed as a vector e.g. the point $(x_a, y_a)$ can be expressed as $\vec{v}_a$. As a next step, a transformation function $T_\lambda$ is developed to map the target area image 3 to the template T:

$$f(\lambda) = \sum_i |T_\lambda(\vec{v}_i) - \vec{v}_i'|^2$$

where the vector $\vec{v}_i$ represents the coordinate pair $(x_i, y_i)$ in the template T, and the vector $\vec{v}_i'$ represents the corresponding coordinate pair $(x_i', y_i')$ in the target area image 3. The parameter set λ, comprising parameters for rotation and translation of the image yielding the most cost-effective solution to the function, can be applied to determine the position and orientation of the pointing device 1 with respect to the object B₁'. The computer vision algorithms make use of the fact that the camera 2 within the pointing device 1 is fixed and "looking" in the direction of the pointing gesture. The next step is to calculate the point of intersection of the longitudinal axis of the pointing device 1 in the direction of pointing target area image A, and therefore the target point $P_T$. Once the coordinates of the point of intersection have been calculated, it is a simple matter to locate this point in the template T.

Although the present invention has been disclosed in the form of preferred embodiments and variations thereon, it will be understood that numerous additional modifications and variations could be made, thereto without departing from the scope of the invention. As an alternative to the pen shape, the pointing device could for example be a mobile phone with a built-in camera, since many mobile phones already are capable of providing tactile feedback to a user in the form of vibrations. A further alternative might be a personal digital assistant (PDA) with a built-in camera. Furthermore, additionally to the tactile indication the feedback signal may be rendered in form of an acoustical signal to better attract the user's attention and/or to present the feedback in a form more easily understood. To this end, a small loudspeaker might be incorporated in the pointing device itself. Such a feedback mode, in which the feedback is also presented audibly, might, if desired, be inactivated, and only activated when the user requires detailed feedback, for example when learning to use the pointing device. For the sake of clarity, it is also to be understood that the use of "a" or "an" throughout this application does not exclude a plurality, and "comprising" does not exclude other steps or elements. A "unit" may comprise a number of blocks or devices, unless explicitly described as a single entity.

The invention claimed is:

1. A method for locating and controlling an object associated with a device to be controlled, the method comprising:
   aiming a pointing device comprising a camera at a target area;
   generating an image of the target area aimed at by the pointing device;
   analyzing the target area image to determine a current property of the object, wherein said current property is changeable and uncorrelated to all previous and future determined properties of the object over time;
   generating a feedback signal regarding the current property of the object, based on analysis of the images;
   and reporting this feedback signal to the user by rendering the feedback signal into a tactile indication generated in at least part of the pointing device,
   wherein the tactile indication indicates to the user a direction in which the user should move the pointing device relative to a current target area.

2. The method according to claim 1, wherein the tactile indication indicates to the user of the pointing device whether an object being pointed at allows interaction with the pointing device.

3. The method according to claim 1, wherein the tactile indication indicates to the user of the pointing device when the target area of the pointing device traverses an edge of an object associated with a device.

4. The method according to claim 2, wherein the tactile indication indicates to the user the nearness of the current target area of the pointing device to an object.

5. The method according to claim 1, wherein the tactile indication is generated by causing a part of the pointing device to vibrate.

6. A system for locating an object associated with a device to be controlled, comprising:
   a pointing device comprising a camera for generating images of a target area in the direction in which the pointing device is aimed;
   an image analysis unit for analyzing the images to determine a current property of the object, wherein said current property is changeable and uncorrelated to all previous and future determined properties of the object over time;
   a feedback signal generation unit for generating a feedback signal, regarding the current property of the object, based on analysis of the images,
   a tactile indication unit of the pointing device for rendering the feedback signal into a tactile indication for a user of the pointing device,
   wherein the tactile indication indicates a direction relative to a current target area of the pointing device in which the object is located.

7. The system according to claim 6, further comprising a control signal generation unit for generating a control signal for the device to be controlled, based on analysis of an image of a target area encompassing at least part of the object; and a communication interface for communicating the control signal to the device to be controlled.

8. A pointing device, comprising:
   a camera for generating an image of a target area in the direction in which the pointing device is aimed and a tactile indication unit for rendering a feedback signal, generated on the basis of an image analysis of the target area image, into a tactile indication generated in at least part of the pointing device, wherein the tactile indication indicates a direction relative to a current target area of the pointing device in which the object is located; and a device control interface comprising an image analysis unit for analyzing target area images generated by a camera of the pointing device to determine a current property of an object associated with a device to be controlled, wherein said current property is changeable and uncorrelated to all previous and future determined properties of the object over time, and a feedback signal generation unit for generating a feedback signal regarding the current property of the object, based on analysis of the images.

9. The pointing device according to claim 8, further comprising a sending unit for sending images to a device control interface; a receiving unit for receiving a feedback signal from a device control interface.

10. A device control interface, comprising:
a receiving unit for receiving images from a pointing device;
an image analysis unit for analyzing the images;
a feedback signal generation unit for generating a feedback signal corresponding to a current property of an object, associated with a device to be controlled, based on analysis of the images, wherein said current property is changeable and uncorrelated to all previous and future determined properties of the object over time;
a sending unit for sending the feedback signal to the pointing device;
wherein the feedback signal indicates a direction relative to a current target area of the pointing device in which the object is located.

11. The device control interface according to claim 10, further comprising a control signal generation unit for generating a control signal for the device to be controlled, based on analysis of an image of a target area encompassing at least part of the object; and a communication interface for communicating the control signal to the device to be controlled.

12. The method according to claim 1, wherein said step of generating a feedback signal regarding the current property of the object, based on analysis of the images further comprises detecting distinctive points in the target image and determining corresponding points in a template and developing a transformation for mapping the points in the target image to the corresponding points in the template.

13. The method according to claim 1, wherein said step of generating a feedback signal regarding the current property of the object, based on analysis of the images further comprises directly comparing the received target area image, centred around the target point, with a pre-defined template to locate the point targeted in the object using methods such as pattern-matching.

14. The method according to claim 1, wherein the changeable current property is a visibility or lack of visibility of the object in the target area.

15. The method according to claim 1, wherein the changeable current property is a distance between the object and a reference point.

16. The method according to claim 1, wherein the changeable current property is a property to be calculated.

17. The method according to claim 1, wherein the changeable current property is a property to be identified.

18. The method according to claim 1, wherein the changeable current property is a the controllability of a device associated with the object.

19. The method according to claim 1, wherein the changeable current property comprises the identification of the object and thereafter a set of commands for interaction with a device associated with the object.

20. The method according to claim 1, further comprising controlling a device with which the object is associated upon the object becoming visible in the target area.

* * * * *